United States Patent [19]

Sragal

[11] 4,145,934
[45] Mar. 27, 1979

[54] FLEXIBLE ENDLESS DRIVE MEANS TENSIONING DEVICE

[76] Inventor: Richard F. Sragal, 1701 Westbrook, Madison Heights, Mich. 48071

[21] Appl. No.: 838,108

[22] Filed: Sep. 30, 1977

[51] Int. Cl.² ........................... F16H 7/12; F16H 7/10
[52] U.S. Cl. ...................... 74/242.11 C; 74/242.15 R
[58] Field of Search ............... 74/242.11 C, 242.11 R, 74/242.15 R, 242.16

[56] References Cited

U.S. PATENT DOCUMENTS

| 3,142,193 | 7/1964 | Polko etal. | 74/242.11 C |
| 3,631,734 | 1/1972 | Wagner | 74/242.11 R |
| 4,077,272 | 3/1978 | Busso | 74/242.1 FP |

Primary Examiner—Leonard H. Gerin
Attorney, Agent, or Firm—Robert G. Mentag

[57] ABSTRACT

A tensioning device for maintaining a constant tension on continuous or endless drive members, such as continuous drive belts, chains and the like. A lever carries an idler roller at one end thereof which is adapted to engage the continuous drive belt, or the like. The lever is pivotally mounted on the engine, machine, or other apparatus which carries the continuous drive belt. A spring means is provided for normally biasing the lever in a direction to move the roller toward the belt to maintain a constant tension thereon. A spring biased wedge means is movably mounted on the lever for engagement with a cam means for holding the lever in an adjusted position. The spring biases the lever against the belt automatically to maintain a constant tension on the belt as the belt stretches or loses its tension. The wedge means permits the lever to automatically move in one direction to maintain a constant tension on the belt, but it restricts movement of the lever in the opposite direction.

10 Claims, 4 Drawing Figures

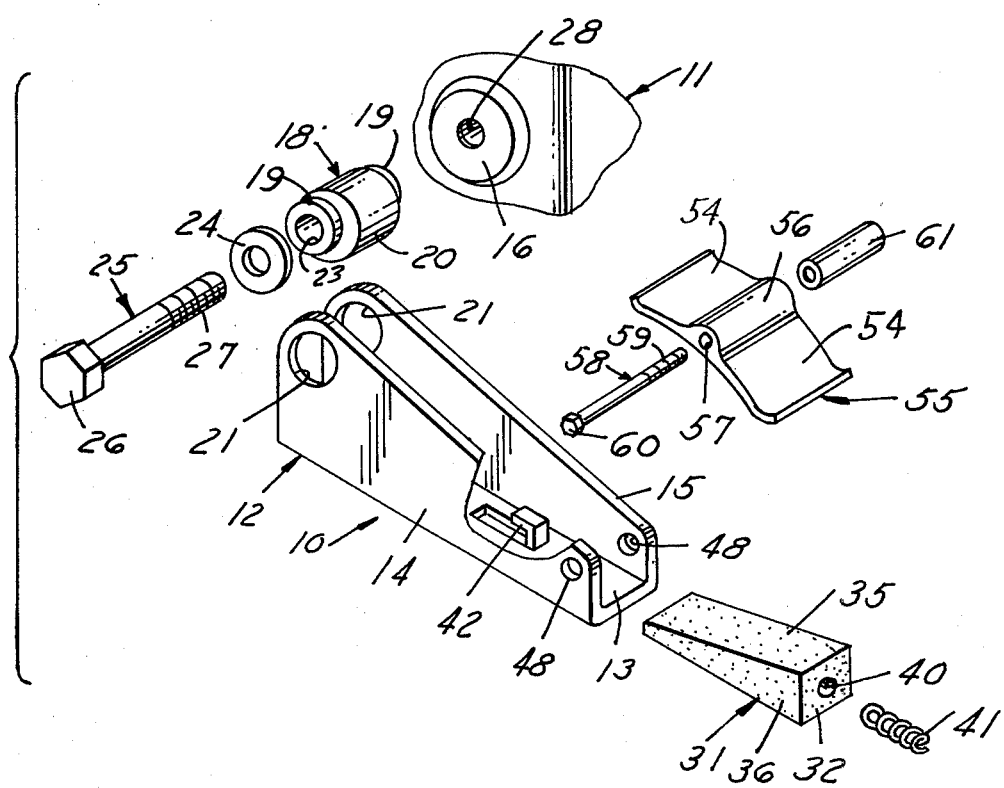
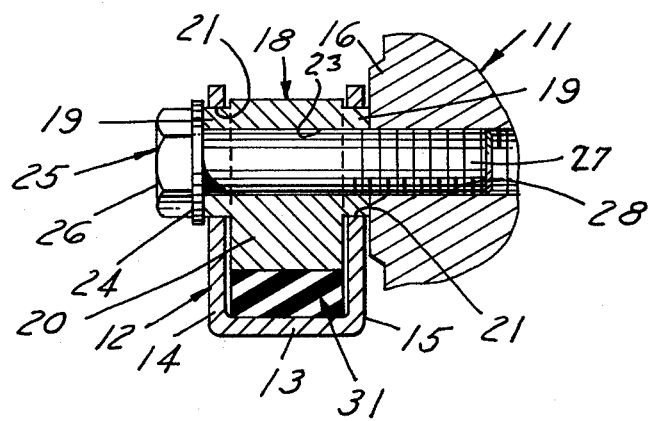

FLEXIBLE ENDLESS DRIVE MEANS TENSIONING DEVICE

SUMMARY OF THE INVENTION

This invention relates generally, to devices for tensioning continuous flexible drive means, such as chains or belts, and more particularly, to a tensioning device for maintaining a constant tension on an internal combustion engine accessory drive belt.

At the present time, the automobile industry is attempting to provide a single drive belt for driving the accessories on an internal combustion engine such as the alternator, water pump, power steering pump, air pump and the like. A problem encountered in the use of such a continuous belt for driving a plurality of accessories on an internal combustion engine is that the belt goes into resonance and vibrates when the engine gets up to a certain speed, and the prior art belt tightening or tensioning devices have not been able to prevent such injurious action with its resultant tearing and destruction of the drive belt.

In view of the foregoing, it is the primary object of the present invention to provide a novel and improved constant tensioning device for endless drive belts, and the like which overcomes the aforementioned problem of the prior art belt tighteners and tensioning devices.

It is another object of the present invention to provide a constant tensioning device for use on endless drive members such as drive belts and chains. It includes a spring biased lever that is pivotally mounted on an apparatus carrying an endless drive belt and which is provided with a non-return wedge means to hold the lever in an adjusted position, yet which permits the lever to automatically move to maintain the desired constant tension.

It is a further object of the present invention to provide a novel and improved constant tensioning device for use on endless drive belts, chains and the like, which is simple and compact in construction, economical to manufacture and efficient in operation.

It is a still further object of the present invention to provide a novel and improved constant tensioning device for use on endless drive belts, chains and the like and which includes a lever pivotally mounted on an apparatus carrying an endless belt, a belt engagement member operatively mounted on one end of said lever, biasing means carried on said belt carrying apparatus and engageable with said lever for normally moving the lever in one direction to maintain the belt engagement member on the belt with a constant desired tension, and a non-return means carried on the lever for preventing movement of the lever in the other direction to maintain the lever in operative engagement with the drive belt. The non-return means includes an eccentric cam and a spring biased wedge means.

Other features and advantages of this invention will be apparent from the following detailed description, appended claims, and the accompanying drawings.

BRIEF DESCRIPTION OF THE DRAWINGS

FIG. 3 is an exploded view of the tensioning device illustrated in FIG. 1, and showing the assembly relationship of the various parts of the tensioning device.

FIG. 4 is a fragmentary, elevation section view of the tensioning device structure illustrated in FIG. 1, taken along the line 4—4 thereof, and looking in the direction of the arrows.

DETAILED DESCRIPTION OF THE PREFERRED EMBODIMENT

Figure 1:
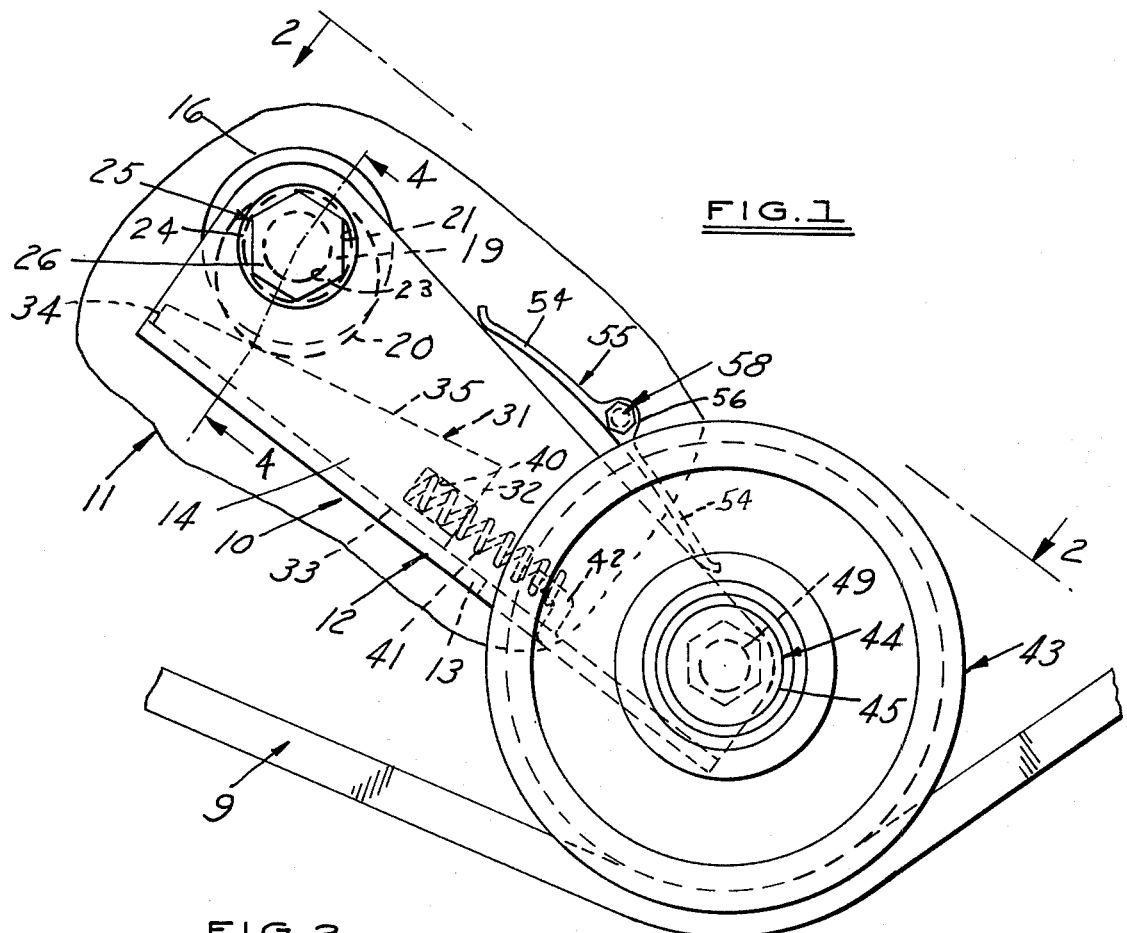
FIG. 1 is a front elevation view of an illustrative embodiment of a flexible endless drive means tensioning device made in accordance with the principles of the present invention.
Figure 2:
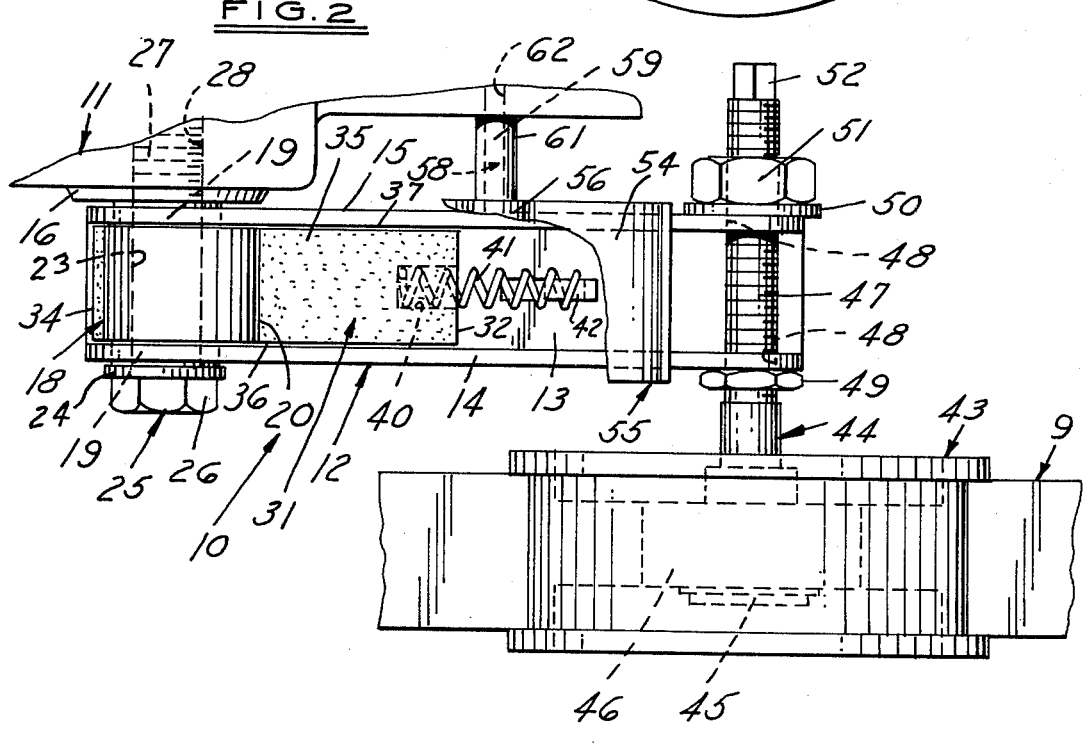
FIG. 2 is a top plan view, with parts broken away, of the structure illustrated in FIG. 1, taken along the line 2—2 thereof, and looking in the direction of the arrows.

Referring now to the drawings, and in particular to FIGS. 1 and 2, the numeral 9 generally designates a flexible endless drive means, such as an accessory drive belt on the front of an internal combustion engine. The numeral 10 generally designates an illustrative embodiment of an endless drive means tensioning device made in accordance with the principles of the present invention which is shown as being mounted on an internal combustion engine, which is shown in fragment, and generally indicated by the numeral 11. The tensioning device 10 is adapted to provide a constant tension on an endless drive belt such as a single drive belt for driving accessories on an internal combustion engine, such as an alternator water pump, power steering pump, and the like.

As shown in FIGS. 1, 2 and 3, the tensioning device 10 is adapted to be mounted on a support means, as for example, the front end of an internal combustion engine 11. The tensioning device 10 includes an elongated lever, generally indicated by the numeral 12. As shown in FIG. 4, the lever 12 is a U-shaped in cross section, and it includes a bottom wall 13, and two upwardly extended, integral side walls 14 and 15. The side walls 14 and 15 vary in height, with the greatest height of each being on what may be termed the rear end of the lever 12. The side walls 14 and 15 slope downwardly and forwardly toward the front end of the lever 12. The lever 12 is mounted adjacent a circular mounting pad 16, which may be integrally formed on the front end of the engine 11. As shown in FIGS. 2 and 4, the lever 12 is disposed with what may be termed the inner wall 15 adjacent the mounting pad 16. It will be understood that the lever 12 may be operatively mounted on a separate support bracket which, in turn, would be mounted directly on the internal combustion engine 11, if desired.

As best seen in FIGS. 1 and 4, the lever 12 has its rear end rotatably mounted on a cam means, generally indicated by the numeral 18. The cam means 18 includes a pair of cylindrical end portions or journals 19, and a central integral eccentric cam portion 20 which is eccentrically formed relative to the cylindrical end portions 19. The end portions 19 are rotatably mounted in circular bores 21 formed through the lever side walls 14 and 15, at the upper rear corners thereof. The cam means 18 is held in a fixed position, with the outer end faces of one of the cylindrical end portions 19 seated on the outer face of the mounting body 16, on the internal combustion engine 11.

As best seen in FIG. 4, the cam means 18 is held in a desired, rotatably adjusted position by an elongated bolt, generally indicated by the numeral 25. The bolt 25 has a head 26 which is spaced by a washer 24 from the outer end of the cam outer end portion 19. The bolt 25 includes an elongated body 27 which has its outer threaded end slidably mounted through the bore 23 which is formed concentric with the cam end portion 19. The threaded end of the bolt body 27 is threadably mounted in a threaded bore 28 that is formed in the block of the internal combustion engine 11, and which extends inwardly from the outer face of the mounting pad 16.

As shown in FIGS. 1 and 2, a tapered wedge means, generally indicated by the numeral 31, is movably mounted inside of the lever 12. The wedge means 31 may be formed from any suitable elastomeric material, as for example, a suitable rubber material. The wedge means 31 could be formed from a suitable metal, but an elastomeric material is preferable because of the added factor of dampening provided by the elastomeric material.

As shown in FIG. 1, the wedge 31 has a rear end 32 which is parallel with its front end 34, and which is formed at right angles to the bottom end 33. The wedge 31 includes a pair of parallel sides 36 and 37, and a tapered top surface 35 which tapers downwardly and forwardly from the upper end of the rear end 32 to the top end of the front end 34.

As shown in FIGS. 1, 2 and 3, the wedge 31 is provided at its rear end 32 with an inwardly extended axial bore 40 in which is received the front end of a suitable compression spring 41. The rear end of the spring 41 is fixedly held in place by a suitable retainer lug 42 which is integrally formed with lever 12, and shown as being struck from the bottom wall 13 of the lever 12. It will be understood that the compression spring 41 operates to normally bias the wedge means 31 to the left, as viewed in FIG. 1, into engagement with the cam means 18 to hold the lever 12 in operative position relative to the cam means 18.

As shown in FIGS. 1 and 2, the constant tensioning device 10 includes an idler roller, generally indicated by the numeral 43, which is supported on a suitable mounting shaft, generally indicated by the numeral 44, by a suitable bearing means 46. The shaft 44 includes an enlarged head 45. As best seen in FIG. 2, the idler mounting shaft 44 is held in a fixed position on the lever 12, in a direction perpendicular to the longitudinal axis of the lever 12. The shaft 44 has an elongated threaded body portion 47 which is extended through bores 48 formed through the lever side walls 36 and 37. The shaft 44 is held in a desired axially adjusted position by the lock nuts 49 and 51, and the washer 50. The free end of the shaft 44 is provided with four flat surfaces 52 which form a wrench engaging shape on the end of the shaft 44 for adjustment of said shaft.

As shown in FIGS. 1 and 2, a leaf spring, generally indicated by the numeral 55, is provided for normally biasing the lever 12 clockwise, as viewed in FIG. 1, to assist in maintaining the idler roller 43 in operative tensioning position against the endless belt 9. As shown in FIG. 3, the leaf spring 55 includes a raised central body portion 56 through which is formed a bore 57 for the reception therethrough of the threaded body 59 of a retainer bolt, generally indicated by the numeral 58. The bolt 58 includes an enlarged head 60 which abuts the outer end of the spring body 56 and extends through a spacer sleeve 61 and into threaded engagement in a bore 62 in the block of the engine 11, as shown in FIG. 2.

The leaf spring 55 includes a pair of spring arms 54 which extend sidewardly outward from the spring body 56. The lower faces of the spring arms 54 rest on the upper edges of the lever side walls 36 and 37. It will be seen from FIG. 1, that when bolt 58 secures the leaf spring 55 in position, that a clockwise bias is normally impressed on the lever 12. It will be understood that any suitable spring means may be employed for maintaining a clockwise bias on the lever 12, to maintain the idler roller 43 in engagement with the belt 9, as for example, a coil pull string or other type spring in lieu of the illustrated leaf spring.

In use, the constant tensioning apparatus of the present invention is secured to the mounting pad 16 by the bolt 25, with the leaf spring 55 attached to the engine in the position shown in FIGS. 1 and 2. The wedge 31 is manually moved to the right, as viewed in FIG. 1, and the lever 12 is swung downwardly in a clockwise direction to operatively engage the idler roller 43 with the endless belt 9. When the lever 12 has been moved downwardly to effect the desired tension on the belt 9, the wedge means 31 is moved to the left, as viewed in FIG. 1, under the eccentric cam portion 20, into locking engagement with the cam means 18. The spring means 41 maintains a normal biasing pressure on the wedge 31 to create a constant pressure to the left, as viewed in FIG. 1, to maintain the wedge 31 in releasable locking engagement with the cam portion 20. It will be understood that the bolt 26 can be loosened to rotatably adjust the cam portion 20 to any desired operative position relative to the wedge 31. It will be understood that as the belt 9 wears through use, it will lose its tension. However, the lever arm 12 is free to be rotated clockwise, as viewed in FIG. 1, by the leaf spring 55 to move the idler lever 43 downwardly to maintain the desired constant tension on the belt 9. The movement of the lever 12 downwardly is not restricted in the clockwise direction by the wedge 31 because the wedge 31 functions to restrain the lever 12 from rotating counterclockwise, which would release the tension on the belt 9.

It will be seen that the spring 41 automatically moves the wedge 31 to the left, as viewed in FIG. 1, into a gripping and retaining engagement with the fixed cam portion 20, after each automatic adjustment of the lever arm 12, to maintain a constant tension on the belt 9. It will be understood that the constant tension apparatus of the present invention may also be used for maintaining a constant tension on other endless tension means, such as endless drive chain and the like.

While it will be apparent that the preferred embodiment of the invention herein disclosed is well calculated to fulfil the objects above stated, it will be appreciated that the invention is susceptible to modification, variation and change.

What I claim is:

1. In a tensioning device for maintaining a constant tension on a flexible endless drive belt carried on an apparatus, the combination comprising:
   (a) a lever;
   (b) pivot means for pivotally mounting said lever on said apparatus;
   (c) a belt engagement member operatively mounted on said lever;
   (d) biasing means connected to said apparatus, and engageable with said lever for normally moving the lever in one direction to maintain the belt engagement member on the belt and with a constant tension; and,
   (e) a continuous engagement non-return means operatively mounted on and engageable with the lever for preventing movement of the lever in the other direction to maintain the lever in operative engagement with the drive belt.

2. In a tensioning device for maintaining a constant tension on a flexible endless drive belt carried on an apparatus, the combination comprising:
(a) a lever;
(b) pivot means for pivotally mounting said lever on said apparatus;
(c) a belt engagement member operatively mounted on said lever;
(d) biasing means connected to said apparatus, and engageable with said lever for normally moving the lever in one direction to maintain the belt engagement member on the belt and with a constant tension;
(e) a non-return means operatively monted on the lever for preventing movement of the lever in the other direction to maintain the lever in operative engagement with the drive belt; and,
(f) said non return means including,
 (1) an adjustable cam means carried by said means for pivotally mounting the lever on said apparatus and adjustably fixed to said apparatus
 (2) a wedge means movably mounted on said lever; and,
 (3) biasing means for biasing the wedge means into unidirectional holding engagement with the cam means.

3. A tensioning device as defined in claim 2, wherein:
(a) said biasing means is a spring means.

4. A tensioning device as defined in claim 2, wherein:
(a) said wedge biasing means is a spring means.

5. A tensioning device as defined in claim 4, wherein said wedge means is made from an elastomeric material.

6. A tensioning device as defined in claim 5, wherein:
(a) one end of said lever is pivotally mounted by said pivot means, and the belt engagement member is operatively mounted on the other end of said lever.

7. A tensioning device as defined in claim 6, wherein said belt engagement member comprises a roller mounted on said other end of said lever.

8. A tensioning device as defined in claim 4, wherein:
(a) said cam means is an eccentric cam.

9. A tensioning device as defined in claim 8, wherein:
(a) said lever is U-shaped in cross section and said wedge means is movably mounted therein.

10. A tensioning device as defined in claim 9, wherein:
(a) said wedge means has a tapered face engageable with said eccentric cam.

* * * * *

UNITED STATES PATENT OFFICE
CERTIFICATE OF CORRECTION

Patent No. 4,145,934                    Dated March 27, 1979

Inventor(s) Richard F. Sragal

It is certified that error appears in the above-identified patent and that said Letters Patent are hereby corrected as shown below:

Column 5, line 16 - "monted" should be --mounted--.

Signed and Sealed this

Twenty-ninth Day of May 1979

[SEAL]

Attest:

RUTH C. MASON
Attesting Officer

DONALD W. BANNER
Commissioner of Patents and Trademarks